United States Patent Office 3,125,587
Patented Mar. 17, 1964

3,125,587
Δ⁸⁽⁹⁾-7-KETO-11-OXY STEROIDS AND PROCESSES OF PREPARING THEM
John M. Chemerda, Metuchen, N.J., assignor to Merck & Co., Inc., Rahway, N.J., a corporation of New Jersey
No Drawing. Filed July 10, 1952, Ser. No. 298,205
9 Claims. (Cl. 260—397.1)

This invention is concerned generally with steroid compounds having an oxygen atom attached to the carbon atom in the 11-position of the molecule, and with processes for preparing these 11-oxygenated steroid compounds. More particularly, it relates to $\Delta^{8(9)}$-7-keto-11-(keto, hydroxy or acyloxy)-cyclopentanopolyhydrophenanthrene compounds and with processes for preparing these compounds starting with the corresponding $\Delta^{8(9)}$ or $^{9(11)}$-7-keto-cyclopentanopolyhydrophenanthrene compound. The $\Delta^{8(9)}$-7-keto-11-(keto, hydroxy or acyloxy)-cyclopentanopolyhydrophenanthrene compounds thus obtained are valuable as intermediates in the synthesis of steroid hormones having an oxygen atom attached to the 11-carbon atom, such as the adrenal hormones, corticosterone, cortisone and Compound F.

This application is a continuation-in-part of my co-pending application, Serial No. 240,052, filed August 2, 1951, now Patent No. 2,734,897.

The $\Delta^{8(9)}$-7-keto-11-(keto, hydroxy or acyloxy)-cyclopentanopolyhydrophenanthrene compounds, subject of the present invention, have at rings B and C the following chemical structure:

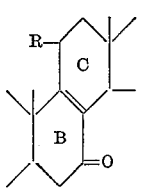

wherein R is a keto, hydroxy or acyloxy radical.

These $\Delta^{8(9)}$-7-keto-11-(keto, hydroxy or acyloxy)-cyclopentanopolyhydrophenanthrene compounds can be prepared as follows: a $\Delta^{8(9)}$-7-keto-cyclopentanopolyhydrophenanthrene compound (Compound 1 hereinbelow), a $\Delta^{9(11)}$-7-keto-cyclopentanopolyhydrophenanthrene compound (Compound 2), or a mixture of these compounds, is reacted with an acylating agent to produce the corresponding enol acylate, that is, the $\Delta^{7,9(11)}$-7-acyloxy-cyclopentanopolyhydrophenanthrene compound (Compound 3); the latter compound is treated with an organic per-acid, whereby the double bond connecting the 9- and 11-carbon atoms is replaced by a 9,11-epoxide linkage, thereby forming the corresponding $\Delta^{7}$-7-acyloxy-9,11-epoxy-cyclopentanopolyhydrophenanthrene compound (Compound 4). This compound is converted by reaction with a hydrolyzing agent such as an alcoholic solution of an alkali metal hydroxide to the corresponding $\Delta^{8(9)}$-7-keto-11-hydroxy-cyclopentanopolyhydrophenanthrene compound (Compound 5). This $\Delta^{8(9)}$-7-keto-11-hydroxycy- clopentanopolyhydrophenanthrene compound is then reacted with an acylating agent thereby forming the corresponding $\Delta^{8(9)}$-7-keto-11-acyloxy-cyclopentanopolyhydrophenanthrene compound (Compound 6); alternatively, the $\Delta^{8(9)}$-7-keto-11-hydroxy-cyclopentanopolyhydrophenanthrene compound (Compound 5), upon reaction with a strong oxidizing agent, is converted to the corresponding $\Delta^{8(9)}$-7,11-diketo-cyclopentanopolyhydrophenanthrene compound (Compound 7).

The reactions indicated hereinabove may be chemically represented, insofar as rings B and C are concerned, as follows:

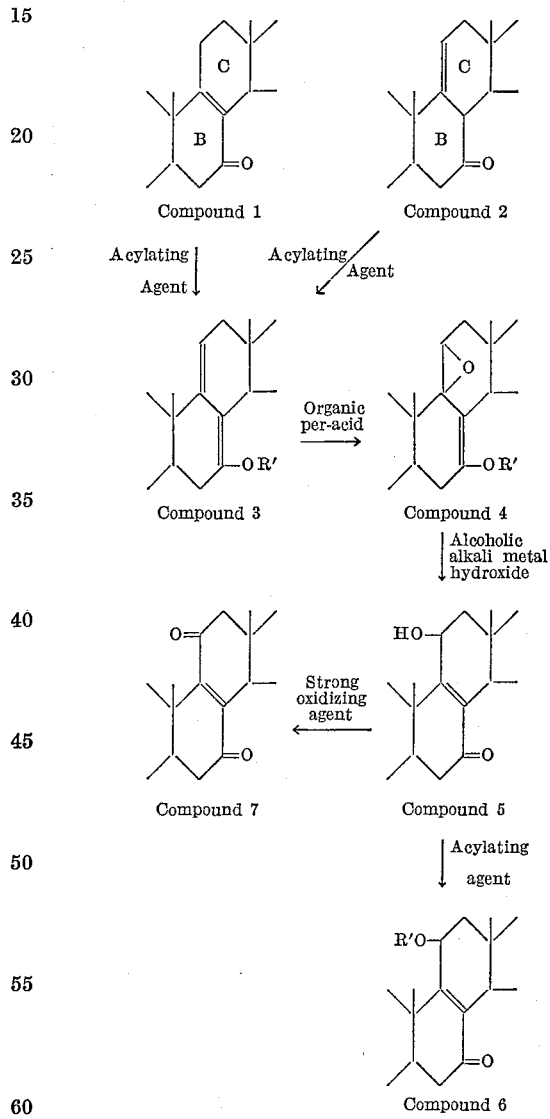

wherein R' represents an acyl radical.

The $\Delta^{8(9)}$-7-keto - cyclopentanopolyhydrophenanthrene compounds and $\Delta^{9(11)}$-7-keto-cyclopentanopolyhydrophenanthrene compounds which we ordinarily employ as starting materials in carrying out the presently invented process are those having a sterol side chain attached to the carbon atom in the 17-position of the molecule such as $\Delta^{8(9),22}$-7-keto - ergostadiene, $\Delta^{9(11),22}$-7-keto-ergostadiene, $\Delta^{8(9),22}$-3-hydroxy-7-keto-ergostadiene, $\Delta^{9(11),22}$-3-hydroxy-7-keto-ergostadiene, $\Delta^{8(9)}$-7-keto-cholestene, $\Delta^{9(11)}$-7-keto-cholestene, $\Delta^{8(9)}$-3-hydroxy-7-keto-cholestene, $\Delta^{9(11)}$-3-hydroxy-7-keto-cholestene, $\Delta^{8,(9),22}$- 3 - hydroxy-7-keto-stigmastadiene, $\Delta^{9(11),22}$-3-hydroxy-7-keto - stigmastadiene, a bile acid side chain attached to the 17-carbon atom such as $\Delta^{8(9)}$-3-hydroxy-7-keto-cholenic acid, $\Delta^{9(11)}$-3-hydroxy-7-keto-cholenic acid, $\Delta^{8(9)}$-3-hydroxy-7-keto - allocholenic acid, $\Delta^{9(11)}$-3-hydroxy-7-keto-allocholenic acid, a degraded bile acid side chain attached to the 17-carbon atom such as $\Delta^{8(9)}$-3-hydroxy-7-keto-bisnorcholenic acid, $\Delta^{9(11)}$ - 3 - hydroxy-7-keto-bisnorcholenic acid, $\Delta^{8(9)}$-3-hydroxy-7-keto-bisnorallocholenic acid, $\Delta^{9(11)}$-3-hydroxy-7-keto-bisnorallocholenic acid, a 17-carboxyl substituent such as $\Delta^{8(9)}$-7-keto-etiocholenic acid, $\Delta^{9(11)}$ - 7 - keto - etiocholenic acid, $\Delta^{8(9)}$-7-keto-etioallocholenic acid, $\Delta^{9(11)}$-7-keto - etioallocholenic acid, a 17-acetyl substituent such as $\Delta^{8(9)}$-3-hydroxy-7-keto-pregnene, $\Delta^{8(9)}$-3-hydroxy-7-keto - allopregnene, a sapogenin side chain such as $\Delta^{8(9)}$-7-ketodehydrotigonenin, $\Delta^{9(11)}$-7-keto-dehydrotigogenin, as well as $\Delta^{8(9)}$ or $\Delta^{9(11)}$-7-keto-cyclopentanopolyhydrophenanthrene compounds having a hydroxy substituent in the 3-position of the molecule esterified by an acyl substituent and the like.

In preparing these $\Delta^{8(9)}$ or $^{9(11)}$-7-keto-cyclopentanopolyhydrophenanthrene compounds, we ordinarily start with the corresponding $\Delta^{7,9(11)}$-cyclopentanopolyhydrophenanthrene compounds, certain of which, such as ergosterol D and 3-acyloxy derivatives thereof, are described in the prior art. Other $\Delta^{7,9(11)}$-cyclopentanopolyhydrophenanthrene compounds can be prepared, starting with readily available $\Delta^5$ - cyclopentanopolyhydrophenanthrene compounds such as cholesterol, by treating said $\Delta^5$-cyclopentanopolyhydrophenanthrene compound (Compound 9 hereinbelow) with bromosuccinimide, reacting the resulting $\Delta^5$-7-bromocyclopentanopolyhydrophenanthrene compound (Compound 10) with a tertiary amine to form the corresponding $\Delta^{5,7}$-cyclopentanopolyhydrophenanthrene compound (Compound 11), reacting this compound with hydrogen in the presence of Raney nickel catalyst thereby selectively reducing the unsaturated linkage attached to the carbon atom in the 5-position to form the corresponding $\Delta^7$ - cyclopentanopolyhydrophenanthrene compound (Compound 12) and bringing said $\Delta^7$-cyclopentanopolyhydrophenanthrene compound into intimate contact with a solution of mercuric acetate in acetic acid thereby producing the corresponding $\Delta^{7,9(11)}$-cyclopentanopolyhydrophenanthrene compound (Compound 13). The reactions indicated hereinabove may be chemically represented (insofar as rings B and C are concerned) as follows:

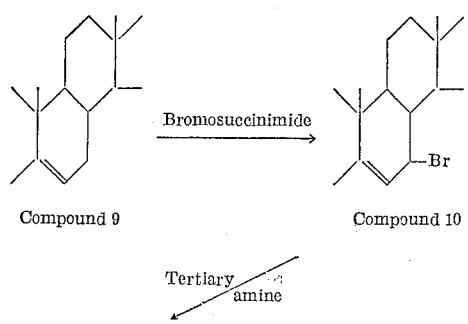

Compound 9      Compound 10

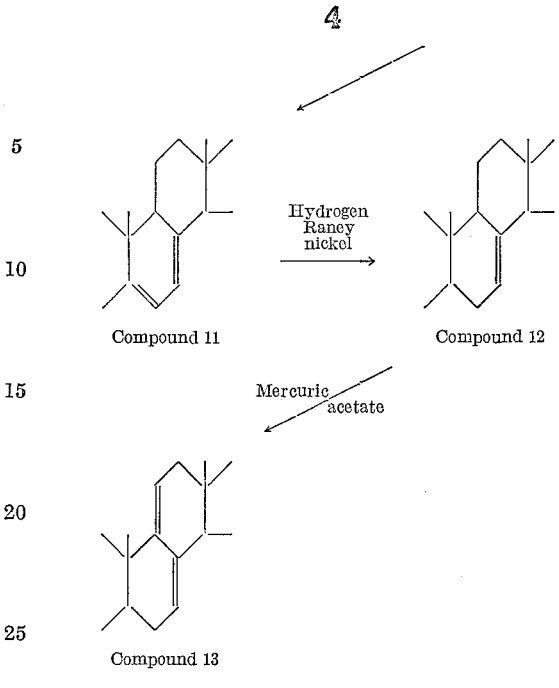

Compound 11      Compound 12

Compound 13

These $\Delta^{7,9(11)}$ - cyclopentanopolyhydrophenanthrene compounds can then be converted to the desired $\Delta^{8(9)}$ or $^{9(11)}$ - 7 - keto-cyclopentanopolyhydrophenanthrene compounds (utilized as starting materials in the presently invented process) as follows: the $\Delta^{7,9(11)}$-cyclopentanopolyhydrophenanthrene compound (Compound 13) is reacted with osmium tetroxide and the intermediate osmate ester is hydrolyzed, preferably by treatment with aqueous sodium sulfite, to form the corresponding $\Delta^{9(11)}$-7,8-dihydroxy - cyclopentanopolyhydrophenanthrene compound (Compound 14) and/or $\Delta^7$-9,11-dihydroxycyclopentanopolyhydrophenanthrene compound (Compound 15). Either of these compounds, or a mixture thereof, is then reacted with an aqueous acidic solution at a temperature between about room temperature and 100° C. to produce a mixture of the desired $\Delta^{8(9)}$-7-keto-cyclopentanopolyhydrophenanthrene compound (Compound 1) and $\Delta^{9(11)}$-7 - keto - cyclopentanopolyhydrophenanthrene compound (Compound 2).

Alternatively, the $\Delta^{7,9(11)}$-cyclopentanopolyhydrophenanthrene compound can be reacted with perbenzoic acid to form the corresponding $\Delta^7$-9,11-epoxy-cyclopentanopolyhydrophenanthrene compound (Compound 16) and/or the corresponding $\Delta^{9(11)}$-7,8-epoxycyclopentanopolyhydrophenanthrene compound (Compound 17). Either of these compounds or a mixture thereof can be reacted with an aqueous acidic solution at a temperature between room temperature and 100° C. to form the desired $\Delta^{8(9)}$ or $^{9(11)}$-7-keto-cyclopentanopolyhydrophenanthrene compound.

If desired, the $\Delta^{7,9(11)}$-cyclopentanopolyhydrophenanthrene epoxide compound can be suspended in a liquid medium such as an alkanoic anhydride, xylene, and the like, and the suspension heated at a temperature of about 150° C. thereby forming directly the corresponding $\Delta^{8(9)}$ or $^{9(11)}$-7-keto-cyclopentanopolyhydrophenanthrene compound (Compounds 1 and 2). Instead of isolating the $\Delta^{8(9)}$ or $^{9(11)}$-7-keto-cyclopentanopolyhydrophenanthrene compound, the reaction mixture can be heated, without purification, with an alkanoyl chloride thereby forming the corresponding enol acylate, the $\Delta^{7,9(11)}$-7-acyloxycyclopentanopolyhydrophenanthrene compound (Compound 3 in column 2 hereinabove). The reaction indicated hereinabove may be chemically represented (with respect to the chemical changes occurring in rings B and C) as follows:

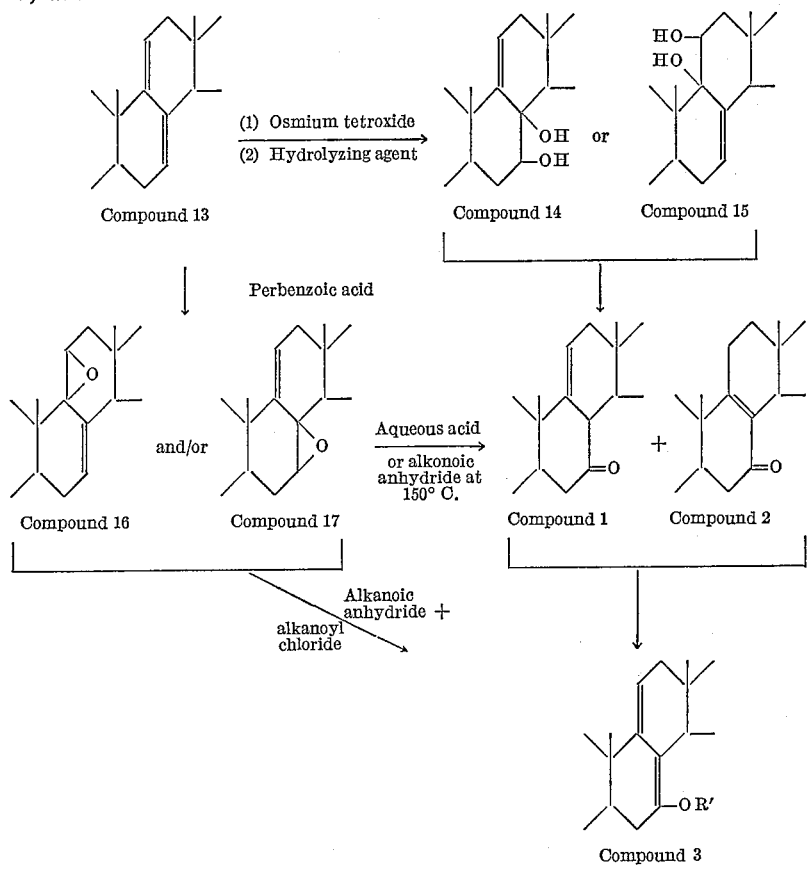

The $\Delta^{8(9)}$ or $^{9(11)}$-7-keto-cyclopentanopolyhydrophenanthrene starting material is reacted with an acylating agent to produce the corresponding enol acylate, the $\Delta^{7,9(11)}$-7-acyloxycyclopentanopolyhydrophenanthrene compound. This acylation reaction is ordinarily carried out by bringing the $\Delta^{8(9)}$-7-ketocyclopentanopolyhydrophenanthrene compound into intimate contact with said acylating agent, preferably a lower alkanoic anhydride such as acetic anhydride, propanoic anhydride, and the like, in the presence of a catalyst such as acetyl chloride, p-toluene sulfonic acid, pyridine and the like, thereby forming said $\Delta^{7,9(11)}$ - 7 - acyloxy-cyclopentanopolyhydrophenanthrene compound such as $\Delta^{7,9(11),22}$-7-acyloxy-ergostatriene,
$\Delta^{7,9(11),22}$-3,7-diacyloxy-ergostatriene,
$\Delta^{7,9(11),22}$-3,7-dialkanoxy-ergostatriene,
$\Delta^{7,9(11),22}$-3,7-dialkanoxy-ergostatriene,
$\Delta^{7,9(11)}$-7-acyloxy-cholestadiene,
$\Delta^{7,9(11)}$-3,7-diacyloxy-cholestadiene,
$\Delta^{7,9(11)}$-3,7-dialkanoxy-cholestadiene,
$\Delta^{7,9(11)}$-3,7-diacetoxy-cholestadiene,
$\Delta^{7,9(11),22}$-3,7-diacyloxy-stigmastatriene,
$\Delta^{7,9(11),22}$-3,7-dialkanoxy-stigmastatriene,
$\Delta^{7,9(11),22}$-3,7-diacetoxy-stigmastatriene,
$\Delta^{7,9(11)}$-3,7-diacyloxy-choladienic acid,
$\Delta^{7,9(11)}$-3,7-dialkanoxy-choladienic acid,
$\Delta^{7,9(11)}$-3,7-diacetoxy-choladienic acid,
$\Delta^{7,9(11)}$-3,7-diacyloxy-allocholadienic acid,
$\Delta^{7,9(11)}$-3,7-dialkanoxy-allocholadienic acid,
$\Delta^{7,9(11)}$-3,7-diacetoxy-allocholadienic acid,
$\Delta^{7,9(11)}$-3,7-diacyloxy-bisnorcholadienic acid,
$\Delta^{7,9(11)}$-3,7-dialkanoxy-bisnorcholadienic acid,
$\Delta^{7,9(11)}$-3,7-diacetoxy-bisnorcholadienic acid,
$\Delta^{7,9(11)}$-3,7-diacyloxy-bisnorallocholadienic acid,
$\Delta^{7,9(11)}$-3,7-dialkanoxy-bisnorallocholadienic acid,
$\Delta^{7,9(11)}$-3,7-diacetoxy-bisnorallocholadienic acid,
$\Delta^{7,9(11)}$-3,7-diacyloxy-etiocholadienic acid,
$\Delta^{7,9(11)}$-3,7-diacyloxy-etioallocholadienic acid,
$\Delta^{7,9(11)}$-3,7-diacyloxy-pregnadiene,
$\Delta^{7,9(11)}$-3,7-dialkanoxy-pregnadiene,
$\Delta^{7,9(11)}$-3,7-diacetoxy-pregnadiene,
$\Delta^{7,9(11)}$-3,7-diacyloxy-allopregnadiene,
$\Delta^{7,9(11)}$-3,7-dialkanoxy-allopregnadiene,
$\Delta^{7,9(11)}$-3,7-diacetoxy-allopregnadiene,
$\Delta^{7,9(11)}$-7-acyloxy-dehydrotigogenin acylate,
$\Delta^{7,9(11)}$-7-alkanoxy-dehydrotigogenin alkanoate,
$\Delta^{7,9(11)}$-7-acetoxy-dehydrotigogenin acetate, and the like.

The $\Delta^{7,9(11)}$ - 7-acyloxy-cyclopentanopolyhydrophenanthrene compound is then reacted with an organic per-acid such as perbenzoic acid, perphthalic acid, and the like, thereby forming the corresponding $\Delta^7$-7-acyloxy-9,11-epoxy - cyclopentanopolyhydrophenanthrene compound. This reaction is conveniently conducted by bringing the reactants together in an organic liquid medium such as benzene, and preferably at about room temperature. The $\Delta^7$ - 7-acyloxy-9,11-epoxy-cyclopentanopolyhydrophenanthrene compounds which can be prepared in accordance with this procedure include the following:

$\Delta^{7,22}$-7-acyloxy-9,11-epoxy-ergostadiene,
$\Delta^{7,22}$-3,7-diacyloxy-9,11-epoxy-ergostadiene,
$\Delta^{7,22}$-3,7-dialkanoxy-9,11-epoxy-ergostadiene,
$\Delta^{7,22}$-3,7-diacetoxy-9,11-epoxy-ergostadiene,
$\Delta^7$-7-acyloxy-9,11-epoxy-cholestene,
$\Delta^7$-3,7-diacyloxy-9,11-epoxy-cholestene,
$\Delta^7$-3,7-dialkanoxy-9,11-epoxy-cholestene,
$\Delta^7$-3,7-diacetoxy-9,11-epoxy-cholestene,
$\Delta^{7,22}$-3,7-diacyloxy-9,11-epoxy-stigmastadiene,
$\Delta^{7,22}$-3,7-dialkanoxy-9,11-epoxy-stigmastadiene,
$\Delta^{7,22}$-3,7-diacetoxy-9,11-epoxy-stigmastadiene,
$\Delta^7$-3,7-diacyloxy-9,11-epoxy-cholenic acid,
$\Delta^7$-3,7-dialkanoxy-9,11-epoxy-cholenic acid,
$\Delta^7$-3,7-diacetoxy-9,11-epoxy-cholenic acid,
$\Delta^7$-3,7-diacyloxy-9,11-epoxy-allocholenic acid,
$\Delta^7$-3,7-dialkanoxy-9,11-epoxy-allocholenic acid, $\Delta^7$-3,7-diacetoxy-9,11-epoxy-allocholenic acid,
$\Delta^7$-3,7-diacyloxy-9,11-epoxy-bisnorcholenic acid,
$\Delta^7$-3,7-dialkanoxy-9,11-epoxy-bisnorcholenic acid,
$\Delta^7$-3,7-diacetoxy-9,11-epoxy-bisnorcholenic acid,
$\Delta^7$-3,7-diacyloxy-9,11-epoxy-bisnorallocholenic acid,
$\Delta^7$-3,7-dialkanoxy-9,11-epoxy-bisnorallocholenic acid,
$\Delta^7$-3,7-diacetoxy-9,11-epoxy-bisnorallocholenic acid,
$\Delta^7$-3,7-diacyloxy-9,11-epoxy-etiocholenic acid,
$\Delta^7$-3,7-diacyloxy-9,11-epoxy-etioallocholenic acid,
$\Delta^7$-3,7-diacyloxy-9,11-epoxy-pregnene,
$\Delta^7$-3,7-dialkanoxy-9,11-epoxy-pregnene,
$\Delta^7$-3,7-diacetoxy-9,11-epoxy-pregnene,
$\Delta^7$-3,7-diacyloxy-9,11-epoxy-allopregnene,
$\Delta^7$-3,7-dialkanoxy-9,11-epoxy-allopregnene,
$\Delta^7$-3,7-diacetoxy-9,11-epoxy-allopregnene,
$\Delta^7$-7-acyloxy-9,11-epoxy-dehydrotigogenin acylate,
$\Delta^7$-alkanoxy-9,11-epoxy-dehydrotigogenin alkanoate,
$\Delta^7$-7-acetoxy-9,11-epoxy-dehydrotigogenin acetate, and the like.

The $\Delta^7$ - 7-acyloxy-9,11-epoxy-cyclopentanopolyhydrophenanthrene compound is then reacted with an alcoholic solution of an alkali metal hydroxide, such as ethanolic potassium hydroxide, methanolic potassium hydroxide, methanolic sodium hydroxide, and the like, thereby hydrolyzing the 9,11-epoxy linkage, as well as other hydrolyzable substituents present in the molecule. This hydrolysis reaction is conveniently carried out by dissolving the $\Delta^7$-7-acyloxy-9,11-epoxy-cyclopentanopolyhydrophenanthrene compound in an alcoholic solution of the alkali metal hydroxide and heating the resulting solution at the reflux temperature. When a $\Delta^7$-7-acyloxy-9,11-epoxy-cyclopentanopolyhydrophenanthrene compound is subjected to these conditions of hydrolysis, there is obtained the corresponding $\Delta^{8(9)}$-7-keto-11-hydroxy-cyclopentanopolyhydrophenanthrene compound such as $\Delta^{8(9),22}$-7-keto-11-hydroxy-ergostadiene,
$\Delta^{8(9),22}$-3,11-dihydroxy-7-keto-ergostadiene,
$\Delta^{8(9)}$-7-keto-11-hydroxy-cholestene,
$\Delta^{8(9)}$-3,11-dihydroxy-7-keto-cholestene,
$\Delta^{8(9),22}$-3,11-dihydroxy-7-keto-stigmastadiene,
$\Delta^{8(9)}$-3,11-dihydroxy-7-keto-cholenic acid,
$\Delta^{8(9)}$-3,11-dihydroxy-7-keto-allocholenic acid,
$\Delta^{8(9)}$-dihydroxy-7-keto-bisnorcholenic acid,
$\Delta^{8(9)}$-3,11-dihydroxy-7-keto-bisnorallocholenic acid,
$\Delta^{8(9)}$-3,11-dihydroxy-7-keto-etiocholenic acid,
$\Delta^{8(9)}$-3,11-dihydroxy-7-keto-etioallocholenic acid,
$\Delta^{8(9)}$-3,11-dihydroxy-7-keto-pregnene,
$\Delta^{8(9)}$-3,11-dihydroxy-7-keto-allopregnene,
$\Delta^{8(9)}$-7-keto-11-hydroxy-dehydrotigogenin, and the like.

Alternatively, the $\Delta^7$-7-acyloxy-9,11,-epoxy-cyclopentanopolyhydrophenanthrene compound can be reacted with a mild hydrolyzing agent (instead of the alcoholic solution of alkali metal hydroxide) whereupon hydrolysis of the enol acylate and epoxy substituents occur without affecting other hydrolyzable substituents, such as ester linkages, in the molecule. This partial hydrolysis reaction is conveniently conducted by reacting said $\Delta^7$-7-acyloxy-9,11 - epoxycyclopentanopolyhydrophenanthrene compound, at approximately room temperature, with water, or preferably with an aqueous solution of a water-miscible solvent, such as an aqueous solution of acetone, an aqueous solution of a lower aliphatic alcohol such as methanol, ethanol, and the like. This partial hydrolysis reaction is ordinarily utilized for the hydrolysis of $\Delta^7$-7-acyloxy-9,11-epoxy - cyclopentanopolyhydrophenanthrene compounds containing at least one additional ester substituent such as $\Delta^{7,22}$-3,7-diacyloxy-9,11-epoxy-ergostadiene,
$\Delta^{7,22}$-3,7-dialkanoxy-9,11-epoxy-ergostadiene,
$\Delta^{7,22}$-3,7-diacetoxy-9,11-epoxy-ergostadiene,
$\Delta^7$-3,7-diacyloxy-9,11-epoxy-cholestene,
$\Delta^7$-3,7-dialkanoxy-9,11-epoxy-cholestene,
$\Delta^7$-3,7-diacetoxy-9,11-epoxy-cholestene,
$\Delta^{7,22}$-3,7-diacyloxy-9,11-epoxy-stigmastadiene,
$\Delta^{7,22}$-3,7-dialkanoxy-9,11-epoxy-stigmastadiene,
$\Delta^{7,22}$-3,7-diacetoxy-9,11-epoxy-stigmastadiene,
$\Delta^7$-3,7-diacyloxy-9,11-epoxy-cholenic acid,
$\Delta^7$-3,7-dialkanoxy-9,11-epoxy-cholenic acid,
$\Delta^7$-3,7-diacetoxy-9,11-epoxy-cholenic acid,
$\Delta^7$-3,7-diacyloxy-9,11-epoxy-allocholenic acid,
$\Delta^7$-3,7-dialkanoxy-9,11-epoxy-allocholenic acid,
$\Delta^7$-3,7-diacetoxy-9,11-epoxy-allocholenic acid,
$\Delta^7$-3,7-diacyloxy-9,11-epoxy-bisnorcholenic acid,
$\Delta^7$-3,7-dialkanoxy-9,11-epoxy-bisnorcholenic acid,
$\Delta^7$-3,7-diacetoxy-9,11-epoxy-bisnorcholenic acid,
$\Delta^7$-3,7-diacyloxy9,11-epoxy-bisnorallocholenic acid,
$\Delta^7$-3,7-dialkanoxy-9,11-epoxy-bisnorallocholenic acid,
$\Delta^7$-3,7-diacetoxy-9,11-epoxy-bisnorallocholenic acid,
$\Delta^7$-3,7-diacyloxy-9,11-epoxy-etiocholenic acid,
$\Delta^7$-3,7-dialkanoxy-9,11-epoxy-etiocholenic acid,
$\Delta^7$-3,7-diacetoxy-9,11-epoxy-etiocholenic acid,
$\Delta^7$-3,7-diacyloxy-9,11-epoxy-pregnene,
$\Delta^7$-3,7-dialkanoxy-9,11-epoxy-pregnene,
$\Delta^7$-3,7-diacetoxy-9,11-epoxy-pregnene,
$\Delta^7$-3,7-diacyloxy-9,11-epoxy-allopregnene,
$\Delta^7$-3,7-dialkanoxy-9,11-epoxy-allopregnene,
$\Delta^7$-3,7-diacetoxy-9,11-epoxy-allopregnene,
$\Delta^7$-7-acyloxy-9,11-epoxy-dehydrotigogenin acylate,
$\Delta^7$-alkanoxy-9,11-epoxy-dehydrotigogenin alkanoate,
$\Delta^7$-7-acetoxy-9,11-epoxydehydrotigogenin acetate, and the like.

The product obtained by this selective hydrolysis of said $\Delta^7$ - 7-acyloxy-9,11-epoxy-cyclopentanopolyhydrophenanthrene compounds containing at least one additional ester substituent is the corresponding $\Delta^{8(9)}$-7-keto-11-hydroxy-cyclopentanopolyhydrophenanthrene compound in which the additional ester substituent remains unchanged; thus, the selective hydrolysis of the compounds enumerated hereinabove results, respectively, in the formation of $\Delta^{8(9),22}$-3-acyloxy-7-keto-11-hydroxy-ergostadiene,
$\Delta^{8(9),22}$-3-alkanoxy-7-keto-11-hydroxy-ergostadiene,
$\Delta^{8(9),22}$-3-acetoxy-7-keto-11-hydroxy-ergostadiene,
$\Delta^{8(9)}$-3-acyloxy-7-keto-11-hydroxy-cholestene,
$\Delta^{8(9)}$-3-alkanoxy-7-keto-11-hydroxy-cholestene,
$\Delta^{8(9)}$-3-acetoxy-7-keto-11-hydroxy-cholestene,
$\Delta^{8(9),22}$-3-acyloxy-7-keto-11-hydroxy-stigmastadiene,
$\Delta^{8(9),22}$-3-alkanoxy-7-keto-11-hydroxy-stigmastadiene,
$\Delta^{8(9),22}$-3-acetoxy-7-keto-11-hydroxystigmastadiene,
$\Delta^{8(9)}$-3-acyloxy-7-keto-11-hydroxy-cholenic acid,
$\Delta^{8(9)}$-3-alkanoxy-7-keto-11-hydroxy-cholenic acid,
$\Delta^{8(9)}$-3-acetoxy-7-keto-11-hydroxy-cholenic acid,
$\Delta^{8(9)}$-3-acyloxy-7-keto-11-hydroxy-allocholenic acid,
$\Delta^{8(9)}$-3-alkanoxy-7-keto-11-hydroxy-allocholenic acid,
$\Delta^{8(9)}$-3-acetoxy-7-keto-11-hydroxy-allocholenic acid,
$\Delta^{8(9)}$-3-acyloxy-7-keto-11-hydroxy-bisnorcholenic acid,
$\Delta^{8(9)}$-3-alkanoxy-7-keto-11-hydroxy-bisnorcholenic acid,
$\Delta^{8(9)}$-3-acetoxy-7-keto-11-hydroxy-bisnorcholenic acid,
$\Delta^{8(9)}$-3-acyloxy-7-keto-11-hydroxy-bisnorallocholenic acid,
$\Delta^{8(9)}$-3-alkanoxy-7-keto-11-hydroxy-bisnorallocholenic acid,
$\Delta^{8(9)}$-3-acetoxy-7-keto-11-hydroxy-bisnorallocholenic acid,
$\Delta^{8(9)}$-3-acyloxy-7-keto-11-hydroxy-etiocholenic acid,
$\Delta^{8(9)}$-3-alkanoxy-7-keto-11-hydroxy-etiocholenic acid,
$\Delta^{8(9)}$-3-acetoxy-7-keto-11-hydroxy-etiocholenic acid,
$\Delta^{8(9)}$-3-acyloxy-7-keto-11-hydroxy-pregnene,
$\Delta^{8(9)}$-3-alkanoxy-7-keto-11-hydroxy-pregnene,
$\Delta^{8(9)}$-3-acetoxy-7-keto-11-hydroxy-pregnene,
$\Delta^{8(9)}$-3-acyloxy-7-keto-11-hydroxy-allopregnene,
$\Delta^{8(9)}$-3-alkanoxy-7-keto-11-hydroxy-allopregnene,
$\Delta^{8(9)}$-3-acetoxy-7-keto-11-hydroxy-allopregnene,
$\Delta^{8(9)}$-7-keto-11-hydroxy-dehydrotigogenin acetylate,
$\Delta^{8(9)}$-7-keto-11-hydroxy-dehydrotigogenin alkanoate,
$\Delta^{8(9)}$-7-keto-11-hydroxy-dehydrotigogenin acetate.

This $\Delta^{8(9)}$ - 7-keto-11-hydroxy-cyclopentanopolyhydrophenanthrene compound is then reacted with an acylating agent to produce the corresponding $\Delta^{8(9)}$-7-keto-11-acyloxy-cyclopentanopolyhydrophenanthrene compound. The acylation of the $\Delta^{8(9)}$-7-keto-11-hydroxy-cyclopentanopolyhydrophenanthrene compound is conveniently carried out utilizing a lower aliphatic acid anhydride, such as acetic anhydride, propionic anhydride, and the like, in the presence of a tertiary amine such as pyridine, although other acylating agents can be used if desired. These acylation reactions are preferably carried out at approximately room temperature although higher or lower temperatures can be employed if desired. The $\Delta^{8(9)}$-7-keto-11 - acyloxy - cyclopentanopolyhydrophenanthrene compounds obtained according to this acylation procedure include the following:

$\Delta^{8(9),22}$-7-keto-11-acyloxy-ergostadiene,
$\Delta^{8(9),22}$-3,11-diacyloxy-7-keto-ergostadiene,
$\Delta^{8(9),22}$-3,11-dialkanoxy-7-keto-ergostadiene,
$\Delta^{8(9),22}$-3,11-diacetoxy-7-keto-ergostadiene,
$\Delta^{8(9)}$-7-keto-11-acyloxy-cholestene,
$\Delta^{8(9)}$-3,11-diacyloxy-7-keto-cholestene,
$\Delta^{8(9)}$-3,11-diacetoxy-7-keto-cholestene,
$\Delta^{8(9),22}$-3,11-diacyloxy-7-keto-stigmastadiene,
$\Delta^{8(9),22}$-3,11-dialkanoxy-7-keto-stigmastadiene,
$\Delta^{8(9),22}$-3,11-diacetoxy-7-keto-stigmastadiene,
$\Delta^{8(9)}$-3,11-diacyloxy-7-keto-cholenic acid,
$\Delta^{8(9)}$-3,11-dialkanoxy-7-keto-cholenic acid,
$\Delta^{8(9)}$-3,11-diacetoxy-7-keto-cholenic acid,
$\Delta^{8(9)}$-3,11-diacyloxy-7-keto-allocholenic acid,
$\Delta^{8(9)}$-3,11-dialkanoxy-7-keto-allocholenic acid,
$\Delta^{8(9)}$-3,11-diacetoxy-7-keto-allocholenic acid,
$\Delta^{8(9)}$-3,11-diacyloxy-7-keto-bisnorcholenic acid,
$\Delta^{8(9)}$-3,11-dialkanoxy-7-keto-bisnorcholenic acid,
$\Delta^{8(9)}$-3,11-diacetoxy-7-keto-bisnorcholenic acid,
$\Delta^{8(9)}$-3,11-diacyloxy-7-keto-bisnorallocholenic acid,
$\Delta^{8(9)}$-3,11-dialkanoxy-7-keto-bisnorallocholenic acid,
$\Delta^{8(9)}$-3,11-diacetoxy-7-keto-bisnorallocholenic acid,
$\Delta^{8(9)}$-3,11-diacyloxy-7-keto-etiocholenic acid,
$\Delta^{8(9)}$-3,11-diacyloxy-7-keto-etioallocholenic acid,
$\Delta^{8(9)}$-3,11-diacyloxy-7-keto-pregnene,
$\Delta^{8(9)}$-3,11-dialkanoxy-7-keto-pregnene,
$\Delta^{8(9)}$-3,11-diacetoxy-7-keto-pregnene,
$\Delta^{8(9)}$-3,11-diacyloxy-7-keto-allopregnene,
$\Delta^{8(9)}$-3,11-dialkanoxy-7-keto-allopregnene,
$\Delta^{8(9)}$-3,11-diacetoxy-7-keto-allopregnene,
$\Delta^{8(9)}$-7-keto-11-acyloxy-dehydrotigogenin acylate,
$\Delta^{8(9)}$-7-keto-11-alkanoxy-dehydrotigogenin alkanoate,
$\Delta^{8(9)}$-7-keto-11-acetoxy-dehydrotigogenin acetate, and the like.

As set forth hereinabove, where it is desired to have an 11-keto substituent in the molecule, the $\Delta^{8(9)}$-7-keto-11-hydroxy-cyclopentanopolyhydrophenanthrene compound is reacted with a strong oxidizing agent, such as chromic acid, thereby forming the corresponding $\Delta^{8(9)}$-7,11-diketo-cyclopentanopolyhydrophenanthrene compound. This oxidation reaction, where chromic acid is used as the oxidizing agent, is conveniently carried out by dissolving the 7 - keto - 9,11 - epoxy-cyclopentanopolyhydrophenanthrene compound in acetone, adding to the resulting solution a solution containing chromic acid dissolved in aqueous sulfuric acid, and allowing the mixture to react at substantially room temperature for a period of approximately one hour. In accordance with this procedure, there is obtained the desired $\Delta^{8(9)}$-7,11-diketo-cyclopentanopolyhydrophenanthrene compound such as $\Delta^{8(9),22}$-7,11-diketo-ergostadiene,
$\Delta^{8(9),22}$-3-acyloxy-7,11-diketo-ergostadiene,
$\Delta^{8(9),22}$-3-alkanoxy-7,11-diketo-ergostadiene,
$\Delta^{8(9),22}$-3-acetoxy-7,11-diketo-ergostadiene,
$\Delta^{8(9)}$-7,11-diketo-cholestene,
$\Delta^{8(9)}$-3-acyloxy-7,11-diketo-cholestene,
$\Delta^{8(9)}$-3-alkanoxy-7,11-diketo-cholestene,
$\Delta^{8(9)}$-3-acetoxy-7,11-diketo-cholestene,
$\Delta^{8(9),22}$-3-acyloxy-7,11-diketo-stigmastadiene,
$\Delta^{8(9),22}$-3-alkanoxy-7,11-diketo-stigmastadiene,
$\Delta^{8(9),22}$-2-acetoxy-7,11-diketo-stigmastadiene,
$\Delta^{8(9)}$-3-acyloxy-7,11-diketo-cholenic acid,
$\Delta^{8(9)}$-3-alkanoxy-7,11-diketo-cholenic acid,
$\Delta^{8(9)}$-3-acetoxy-7,11-diketo-cholenic acid,
$\Delta^{8(9)}$-3-acyloxy-7,11-diketo-allocholenic acid,
$\Delta^{8(9)}$-3-alkanoxy-7,11-diketo-allocholenic acid,
$\Delta^{8(9)}$-3-acetoxy-7,11-diketo-allocholenic acid,
$\Delta^{8(9)}$-3-acyloxy-7,11-diketo-bisnorcholenic acid,
$\Delta^{8(9)}$-3-alkanoxy-7,11-diketo-bisnorcholenic acid,
$\Delta^{8(9)}$-3-acetoxy-7,11-diketo-bisnorcholenic acid,
$\Delta^{8(9)}$-3-acyloxy-7,11-diketo-bisnorallocholenic acid,
$\Delta^{8(9)}$-3-alkanoxy-7,11-diketo-bisnorallocholenic acid,
$\Delta^{8(9)}$-3-acetoxy-7,11-diketo-bisnorallocholenic acid,
$\Delta^{8(9)}$-3-acyloxy-7,11-diketo-etiocholenic acid,
$\Delta^{8(9)}$-3-acyloxy-7,11-diketo-etiocholenic acid,
$\Delta^{8(9)}$-3-acyloxy-7,11-diketo-pregnene,
$\Delta^{8(9)}$-3-alkanoxy-7,11-diketo-pregnene,
$\Delta^{8(9)}$-3-acetoxy-7,11-diketo-pregnene,
$\Delta^{8(9)}$-3-acyloxy-7,11-diketo-allopregnene,
$\Delta^{8(9)}$-3-alkanoxy-7,11-diketo-allopregnene,
$\Delta^{8(9)}$-3-acetoxy-7,11-diketo-allopregnene,
$\Delta^{8(9)}$-7,11-diketo-dehydrotigogenin acylate,
$\Delta^{8(9)}$-7,11-diketo-dehydrotigogenin alkanoate,
$\Delta^{8(9)}$-7,11-diketo-dehydrotigogenin acetate, and the like.

The $\Delta^{8(9)}$ - 3,11-dihydroxy-7-keto-cyclopentanopolyhydrophenanthrene compounds (Compound 6 hereinabove) are readily converted to steroid hormones having an oxygen atom attached to the 11-carbon atom as follows: the $\Delta^{8(9)}$ - 3,11-dihydroxy-7-keto-cyclopentanopolyhydrophenanthrene compound is reacted with zinc and acetic acid thereby forming the corresponding 3,11-dihydroxy-7-keto-cyclopentanopolyhydrophenanthrene compound, which is heated with a diethylene glycol solution of hydrazine and potassium hydroxide to produce the corresponding 3,11-dihydroxy-cyclopentanoperhydrophenanthrene compound; this 3,11 - dihydroxy-cyclopentanoperhydrophenanthrene compound is then treated according to known methods (the exact method of treatment depending upon the side chain attached to the 17-carbon atom) to convert the organic substituent attached to the 20-carbon atom to a keto radical thus forming the corresponding 3,11-dihydroxy-20-keto-pregnane. (For example, where the side chain attached to the 17-carbon atom is that present in the bile acid, bisnorallocholanic acid, the 3,11-dihydroxy-bisnorallocholanic acid is esterified, the methyl 3,11-dihydroxy-bisnorallocholanate is reacted with phenyl magnesium iodide to form 3,11-dihydroxy-20-allopreganyl-diphenyl-carbinol; the latter compound is reacted with acetic anhydride to produce 3,11-diacetoxy-allo-etiocholanyl-methyl-diphenyl-ethylene, and this compound is treated with ozone to form 3,11-diacetoxy-20-keto-allopregnane.) This 3,11 - diacetoxy-20-keto-allopregnane (obtained as described above starting with 3,11-dihydroxy bisnorallocholanic acid, or if preferred, by degrading the side chain of some other 3,11-dihydroxy-cyclopentanoperhydrophenanthrene compound) is then reacted with acetic anhydride in the presence of p-toluene sulfonic acid catalyst thereby forming the corresponding $\Delta^{17}$-3,11-20-triacetoxy-pregnene; this compound is reacted with perbenzoic acid to form 3,11-diacyloxy-17-hydroxy-20-keto-allopregnane; the latter compound is then reacted with bromine followed by sodium acetate thereby forming the corresponding 3,11,20-triacetoxy-17-hydroxy-20-keto-allopregnane which, upon reaction with a hydrolyzing agent followed by a partial esterification, yields the corresponding 3,11,17-trihydroxy-20-keto-21-acetoxy-allopregnane; the 3,11,17-trihydroxy-20-keto-21-acetoxy-allopregnane is then reacted with chromic acid thereby forming 3,11,20-triketo-17-hydroxy-21-acetoxy-allopregnane which is reacted with two molecular equivalents of bromine followed by rearrangement to produce the corresponding 2,4-dibromo - 3,11,20 - triketo-17-hydroxy-21-acetoxy-allopregnane; this compound is reacted with a dehydrohalogenating agent and a reducing agent to form cortisone acetate, i.e., $\Delta^4$-3,11,20-triketo-17-hydroxy-21-acetoxy-pregnene.

The following examples illustrate methods of carrying out the present invention, but it is to be understood that these examples are given for purposes of illustration and not of limitation.

*Example 1*

Four hundred milligrams of $\Delta^{8,22}$-3-hydroxy-7-keto-ergostadiene (which can be prepared, starting with ergosterol D acetate, in accordance with the procedure set forth in columns 4 and 5 hereinabove and described more particularly in a copending application of the present applicant, Serial No. 240,051, filed August 2, 1951) were mixed with 1 cc. of acetic anhydride and 1 cc. of acetyl chloride, and the mixture was heated under reflux for a period of about one hour. The solvents were evaporated from the reaction mixture to give crude $\Delta^{7,9(11),22}$-3,7-diacetoxy-ergostatriene which was obtained as a yellow gum;

$\lambda$ max. 237 mu, $E_{1cm}^{1\%}$ 247, $\lambda$ max. 241 mu, $E_{1cm}^{1\%}$ 252

This material was subjected to further purification by chromatography to give a product having an extinction coefficient of 320.

*Example 2*

A mixture containing 1 gram of $\Delta^{8,22}$-3-hydroxy-7-keto-ergostadiene, 20 cc. of acetic anhydride and 20 cc. of acetyl chloride was heated under reflux for a period of about one hour. The solvents were evaporated from the reaction mixture in vacuo to give crude $\Delta^{7,9(11),22}$-3,7-diacetoxy-ergostatriene. This material was dissolved in 25 cc. of benzene, and to this solution was added 15.5 cc. of a solution of perbenzoic acid in benzene having a normality of 0.375. The resulting solution was allowed to stand at room temperature for a period of about twelve hours, the reaction solution was extracted with an aqueous solution of sodium hydroxide, then with water, and dried. The dry benzene solution was evaporated in vacuo to give crude $\Delta^{7,22}$-3,7-diacetoxy-9,11-epoxy-ergostadiene as a residual gum.

This material was subjected to chromatographic purification utilizing ether-petroleum-ether as the eluting solvent to give substantially pure $\Delta^{7,22}$-3,7-diacetoxy-9,11-epoxy-ergostadiene. *Analysis.*—Calc'd for $C_{32}H_{48}O_5$: C, 74.96; H, 9.43. Found: C, 74.43; H, 9.17.

*Example 3*

Four hundred milligrams of $\Delta^{7,22}$-3,7-diacetoxy-9,11-epoxy-ergostadiene, prepared substantially as described in Example 2 hereinabove, was dissolved in aqueous methanol and the resulting solution was allowed to stand for approximately twelve hours at room temperature. The crystalline material which separated in the form of clusters of needles was recovered by filtration and dried to give 300 mg. of $\Delta^{8(9),22}$-3-acetoxy-7-keto-11-hydroxy-ergostadiene; M.P. 183–192° C.

This material was recrystallized from methanol to give substantially pure $\Delta^{8(9),22}$-3-acetoxy-7-keto-11-hydroxy-ergostadiene; M.P. 194–196° C. *Analysis.*—Calc'd for $C_{30}H_{46}O_4$: C, 76.55; H, 9.85. Found: C, 76.48; H, 9.60.

*Example 4*

One hundred milligrams of $\Delta^{7,22}$-3,7-diacetoxy-9,11-epoxy-ergostadiene was dissolved in a 1 N solution of sodium hydroxide in methanol, and the resulting solution was heated under reflux for a period of one hour. The resulting solution was diluted with water, and the crystalline material which separated was recovered by filtration to give crude $\Delta^{8,22}$-3,11-dihydroxy-7-keto-ergostadiene. This material was purified by recrystallization from acetone to give 90 mg. of substantially pure $\Delta^{8,22}$-3,11-dihydroxy-7-keto-ergostadiene which was obtained in the form of silky needles; M.P. 213–215° C.; $\lambda$ max. 255 mu; $E^\%$ 197 (alcohol). *Analysis.*—Calc'd for $C_{28}H_{44}O_3$: C, 78.46; H, 10.34. Found: C, 78.20; H, 10.24.

*Example 5*

One hundred milligrams of $\Delta^{7,22}$-3,11-dihydroxy-7-keto-ergostadiene, prepared substantially as described in Example 4, hereinabove, were dissolved in 2 cc. of pyridine containing one cc. of acetic anhydride and the resulting solution was allowed to stand at room temperature for approximately six hours. The acetylation mixture was evaporated in vacuo and the residual material was recrystallized from methanol to give needles of $\Delta^{8,22}$-3,11-diacetoxy-7-keto-ergostadiene; M.P. 176–177° C. *Analysis.*—Calc'd for $C_{32}H_{48}O_5$: C, 74.96; H, 9.43. Found: C, 74.94; H, 9.50.

*Example 6*

One hundred and sixty milligrams of $\Delta^{8(9),22}$-3-actoxy-7-keto-11-hydroxy-ergostadiene, prepared substantially as described in Example 3 hereinabove, were dissolved in 10 cc. of acetone and to this solution was added a solution containing 23 mg. of chromic acid in 1 cc. of 2 N sulfuric acid. The resulting mixture was allowed to react at room temperature for a period of approximately one hour, and the acetone was evaporated from the reaction mixture in vacuo. The residual material was diluted with water, and the crystalline material which separated was recovered by filtration and dried to give crude $\Delta^{8,22}$-3-acetoxy-7,11-diketo-ergostadiene; M.P. 115–126° C. This material was recrystallized from methanol to give 90 mg. of substantially pure $\Delta^{8,22}$-3-acetoxy-7,11-diketo-ergostadiene; M.P. 135–136° C.; $\lambda$ max. 265 mu; E% 193 (isooctane).

*Example 7*

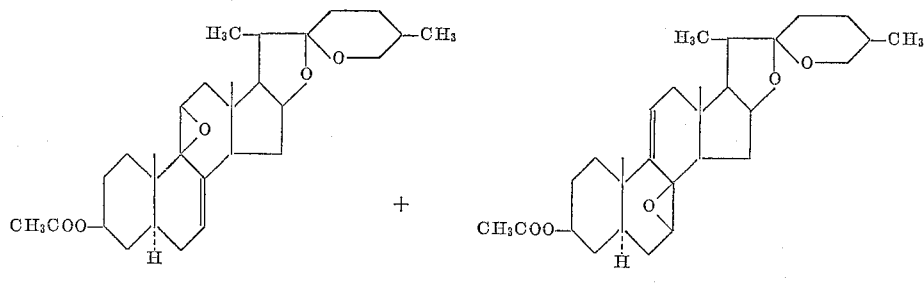

Compound 18 + Compound 19

Aqueous $H_2SO_4$

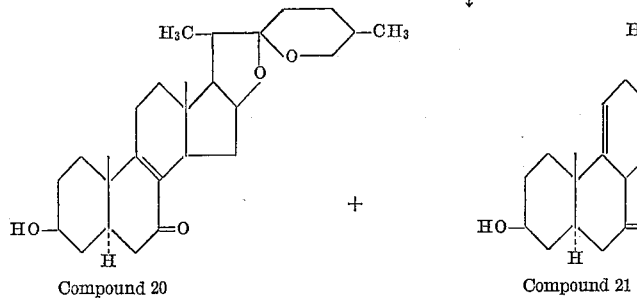

Compound 20 + Compound 21

Acetic anhydride
acetyl chloride

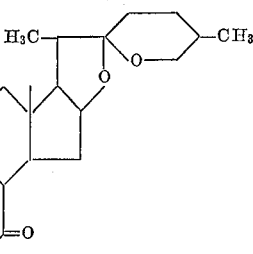

Compound 23 ← Perbenzoic acid — Compound 22

Age aqueous methanol ↓

Compound 24 — Chromic acid → Compound 25

The $\Delta^{7,9(11)}$-bisdehydrotigogenin acetate epoxide utilized as the starting material in the following example can be prepared according to the procedure set forth in detail in co-pending applications, Serial No. 213,807, filed March 3, 1951, and Serial No. 215,026, filed March 10, 1951. In that procedure, diosgenin-3 acetate is reacted with N-bromosuccinimide and the resulting 7-bromo-diosgenin-3 acetate is heated with collidine thereby forming $\Delta^7$-dehydrodiosgenin-3 acetate, the $\Delta^7$-dehydrodiosgenin-3 acetate is reacted with hydrogen in the presence of Raney nickel catalyst thereby forming $\Delta^7$-dehydrotigogenin acetate, the latter compound is treated with mercuric acetate in glacial acetic acid to produce the $\Delta^{7,9(11)}$-bisdehydrotigogenin acetate, and said $\Delta^{7,9(11)}$-bisdehydrotigogenin acetate is reacted with perbenzoic acid in benzene solution thereby forming the desired $\Delta^{7,9(11)}$-bisdehydrotigogenin acetate epoxide.

A hot solution of 1.0 g. of the $\Delta^{7,9(11)}$-bisdehydrotigogenin acetate epoxide (Compounds 18 and 19) in 60 cc. of dioxane was diluted with 10 cc. of water. Two cubic centimeters of a 2 N aqueous solution of sulfuric acid was added to the aqueous dioxane solution, and the resulting mixture was heated to a temperature of about 90–100° C. for a period of approximately twelve hours. At the end of this heating period, the reaction mixture was evaporated substantially to dryness to give a mixture of $\Delta^{8(9)}$ and $9(11)$-7-keto-dehydrotigogenin (Compounds 20 and 21). This mixture was dissolved in a mixture of 20 cc. of acetic anhydride and 20 cc. of acetyl chloride, and the resulting solution was heated under reflux for a period of about four hours. The solvents were removed from the reaction mixture by evaporation in vacuo to give the crude enol acetate, $\Delta^{7,9(11)}$-7-acetoxy-bisdehydrotigogenin acetate (Compound 22).

This crude enol acetate was dissolved in 25 cc. of benzene, and to this solution was added 10 cc. of an 0.5 N solution of perbenzoic acid in benzene. The resulting mixture was allowed to stand at room temperature for approximately six hours, and the benzene reaction solution was extracted with a sufficient quantity of a 2 N aqueous solution of sodium hydroxide to remove acidic products. The benzene solution was then dried and the solvents evaporated therefrom in vacuo to give $\Delta^{8(9)}$-7-acetoxy-19, 11-epoxy-dehydrotigogenin acetate (Compound 23).

The latter product was dissolved in 50 cc. of methanol containing 2 cc. of water, and the solution was allowed to stand at room temperature for a period of approximately twelve hours. The solvents were then evaporated from this solution in vacuo to give $\Delta^{8(9)}$-7-keto-11-hydroxy-dehydrotigogenin acetate (Compound 24).

The latter product was dissolved in 50 cc. of acetone and to the solution was added a solution containing 230 mg. of chromium trioxide dissolved in 10 cc. of 0.72 N aqueous sulfuric acid. The resulting mixture was allowed to stand at room temperature for a period of about one hour. The reaction mixture was then diluted with water, and the crystalline material which separated was recovered by filtration, dried and purified by recrystallization from methanol to give substantially pure $\Delta^{8(9)}$-7,11-diketo-dehydrotigogenin acetate (Compound 25); M.P. 226–227° C.; $\alpha_D^{24°}=14°$ (chloroform).

*Example 8*

Two grams of methyl $\Delta^{7,9(11)}$-3-acetoxy-choladienate epoxide (which can be prepared as described in co-pending application Serial No. 215,026, filed March 10, 1951) were suspended in 20 cc. of acetic anhydride, and the suspension was heated in a sealed tube at a temperature of 150° C. for a period of about four hours. The reaction solution was cooled to room temperature whereupon large rectangular crystalline plates separated from the solution. This crystalline material was recovered by filtration, washed with acetic anhydride and dried to give about 1.1 g. of crude methyl $\Delta^{9(11)}$-3-acetoxy-7-keto-cholenate; M.P. 168–170° C. This material was purified by chromatography followed by recrystallization from acetic anhydride to give substantially pure methyl $\Delta^{9(11)}$-3-acetoxy-7-keto-cholenate; M.P. 185° C.

One gram of crude methyl $\Delta^{9(11)}$-3-acetoxy-7-keto-cholenate, prepared as described above, was dissolved with heating in 20 cc. of acetic anhydride and 20 cc. of acetyl chloride, and the solution was heated under reflux for about one hour. The reaction solution was evaporated under reduced pressure to give methyl $\Delta^{7,9(11)}$-3,7-diacetoxy-choladienate which was obtained in the form of a syrup which absorbs in the ultraviolet at 2430 A.;

$$E_{1\,cm.}^{\%}=252$$

*Example 9*

A suspension of 1.34 g. (0.003 mole) of methyl $\Delta^{7,9(11)}$-3-acetoxy-choladienate epoxide in 20 cc. of acetic anhydride was heated in a sealed tube at 150° C. for about four hours. Twenty cubic centimeters of acetyl chloride was added to the reaction solution and the resulting solution was heated at reflux temperature for a period of approximately one hour. The reaction solution was evaporated under reduced pressure to give 1.46 g. of methyl $\Delta^{7,9(11)}$-3,7-diacetoxy-chloadienate which was obtained in the form of a syrup which absorbs in the ultraviolet at 2430 A.;

$$E_{1\,cm.}^{\%}=252$$

*Example 10*

One and forty-six one-hundredths grams (0.003 mole) of methyl $\Delta^{7,9(11)}$-3,7-diacetoxy-choladienate, prepared as described in Example 9 hereinabove, was dissolved in 25 cc. of benzene and the solution was cooled to 15° C. A benzene solution (10.3 cc.) containing 0.003 mole of perbenzoic acid was added over a period of fifteen minutes to the solution containing the methyl $\Delta^{7,9(11)}$-3,7-diacetoxy-choladienate, and the resulting solution was maintained at room temperature for a period of about fifteen hours. The benzene reaction solution was extracted with a 5% aqueous solution of potassium hydroxide thereby removing acidic material, and the benzene layer was then extracted with water until neutral. The benzene solution was dried over anhydrous sodium sulfate and evaporated in vacuo to give methyl $\Delta^7$-3,7-diacetoxy-9,11-epoxy-cholenate.

The methyl $\Delta^7$-3,7-diacetoxy-9,11-epoxy-cholenate, prepared as described above, was dissolved in 7 cc. of 85% aqueous methanol and the solution was allowed to stand at room temperature for approximately twenty-four hours. The solvent was then evaporated in vacuo and the residual material was triturated with ether. The crystalline product was recovered by filtration and dried to give 0.14 g. of methyl $\Delta^{8(9)}$-3-acetoxy-7-keto-11-hydroxy-cholenate. This material was purified by recrystallization from ethyl acetate to give substantially pure methyl $\Delta^{8(9)}$-3-acetoxy-7-keto-11-hydroxy-cholenate; M.P. 171–173°

C. *Analysis.*—Calc'd for $C_{27}H_{40}O_6$: C, 70.40; H, 8.75. Found: C, 70.37; H, 8.98. λ max. 2540 A., $$E_{1\,cm.}^{\%}\,180$$

$\alpha_D^{23°C.}=+8°$ (chloroform).

*Example 11*

Thirty milligrams of chromium trioxide were dissolved in 0.3 cc. of 10% aqueous sulfuric acid, and the solution was added, with stirring at a temperature of about 20° C. to a solution containing 100 mg. of methyl $\Delta^{8(9)}$-3-acetoxy-7-keto-11-hydroxy-cholenate dissolved in 10 cc. of acetone. The resulting mixture was stirred at a temperature of 20° C. for a period of one hour, and the insoluble chromium residue was removed by filtration and washed with a small volume of acetone. The filtered acetone solution and washings were added to 100 cc. of ice water, and the crystalline material which precipitated was recovered by filtration, washed free of acid with water and dried to give 80 mg. of methyl $\Delta^{8(9)}$-3-acetoxy-7,11-diketo-cholenate. This material was recrystallized from ethanol to give substantially pure methyl $\Delta^{8(9)}$-3-acetoxy-7,11-diketo-cholenate; M.P. 114–115° C. *Analysis.*—Calc'd for $C_{27}H_{38}O_6$: C, 70.70; H, 8.35. Found: C, 70.93; H, 8.30. $[\alpha]_D^{23°}=+42°$ (chloroform) λ max. 2710 A., $$E_{1\,cm.}^{\%}\,183$$

Various changes and modifications may be made in carrying out the present invention without departing from the spirit and scope thereof. Insofar as these changes and modifications are within the purview of the annexed claims, they are to be considered as part of my invention.

I claim:

1. $\Delta^{8(9),22}$ - 3,11-dihydroxy-7-keto-ergostadiene having the formula:

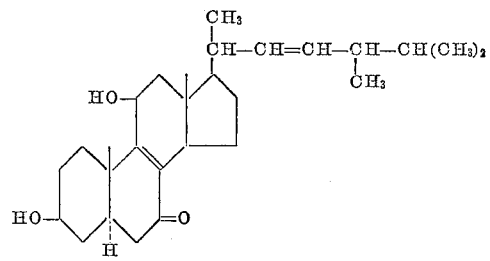

2. $\Delta^{8(9),22}$-3,11-diacetoxy-7-keto-ergostadiene having the formula:

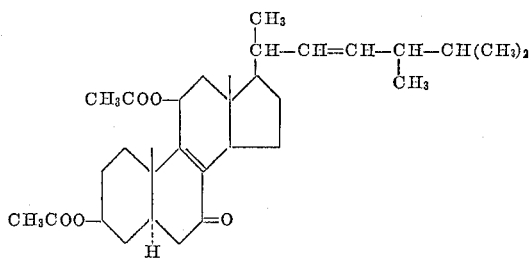

3. $\Delta^{8(9),22}$ - 3 - acetoxy-7-keto-11-hydroxy-ergostadiene having the formula:

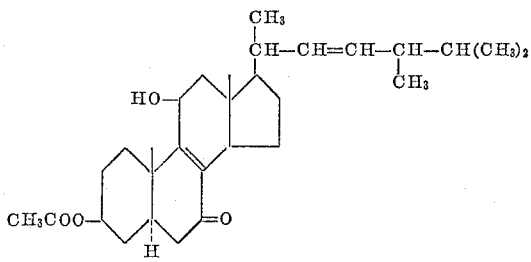

4. The process which comprises reacting $\Delta^{7,22}$-3,7-diacetoxy-9,11-epoxy-ergostadiene with a hydrolyzing agent comprising an alcoholic solution of an alkali metal hydroxide followed by an acetylating agent to produce $\Delta^{8(9),22}$-3,11-diacetoxy-7-keto-ergostadiene.

5. The process which comprises reacting methyl $\Delta^7$-3,7-diacetoxy-9,11-epoxy-cholenate with a mild hydrolyzing agent comprising an aqueous solution of a lower alkanol to produce methyl $\Delta^{8(9)}$-3-acetoxy-7-keto-11-hydroxy-cholenate, and reacting the latter compound with chromic acid to form methyl $\Delta^{8(9)}$-3-acetoxy-7,11-diketo-cholenate.

6. The process which comprises reacting $\Delta^{7,22}$-3,7-diacetoxy-9,11-epoxy-ergostadiene with a mild hydrolyzing agent comprising an aqueous solution of a lower alkanol to produce $\Delta^{8(9),22}$-3-acetoxy-7-keto-11-hydroxy-ergostadiene.

7. The process which comprises reacting $\Delta^{8(9),22}$-3-acetoxy-7-keto-11-hydroxy-ergostadiene with a methanolic solution of sodium hydroxide to produce $\Delta^{8(9),22}$-3,11-dihydroxy-7-keto-ergostadiene.

8. The process which comprises reacting $\Delta^{7,22}$-3,7-diacetoxy-9,11-epoxy-ergostadiene with a methanolic solution of sodium hydroxide thereby forming $\Delta^{8(9),22}$-3,11-dihydroxy-7-keto-ergostadiene.

9. The process which comprises reacting $\Delta^{8(9),22}$-3,11-dihydroxy-7-keto-ergostadiene with an acetylating agent to form $\Delta^{8(9),22}$-3,11-diacetoxy-7-keto-ergostadiene.

References Cited in the file of this patent
UNITED STATES PATENTS

| | | |
|---|---|---|
| 2,768,184 | Ruzicka et al. | Oct. 23, 1956 |
| 2,768,187 | Ruzicka et al. | Oct. 23, 1956 |

OTHER REFERENCES

Stork: J. Am. Chem. Soc., July 1951, rec'd June 11, 1951, vol. 73, pages 3546–47.